(12) United States Patent
Tsai et al.

(10) Patent No.: US 11,256,165 B2
(45) Date of Patent: Feb. 22, 2022

(54) PROJECTION DEVICE AND HEAT DISSIPATION CONTROL METHOD (71) Applicant: Coretronic Corporation, Hsin-Chu (TW)

(72) Inventors: Te-Ying Tsai, Hsin-Chu (TW); Kun-Chieh Chan, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/144,142

(22) Filed: Jan. 8, 2021

(65) Prior Publication Data

US 2021/0223671 A1 Jul. 22, 2021

(30) Foreign Application Priority Data

Jan. 17, 2020 (CN) .......................... 202010052053.3

(51) Int. Cl.
*G03B 21/16* (2006.01)
*H04N 9/31* (2006.01)

(52) U.S. Cl.
CPC ........... *G03B 21/16* (2013.01); *H04N 9/3144* (2013.01)

(58) Field of Classification Search
CPC ............................. G03B 21/16; H04N 9/3144
See application file for complete search history.

(56) References Cited

U.S. PATENT DOCUMENTS

2006/0291994 A1 12/2006 Bok et al.
2011/0025985 A1* 2/2011 Karasawa ............... G03B 21/16
353/54

(Continued)

FOREIGN PATENT DOCUMENTS

CN 102629071 8/2012
CN 103105717 5/2013
(Continued)

OTHER PUBLICATIONS

"Office Action of China Counterpart Application", dated Nov. 23, 2021, p. 1-p. 12.
(Continued)

*Primary Examiner* — Bao-Luan Q Le
(74) *Attorney, Agent, or Firm* — JCIPRNET (57) ABSTRACT A projection device and a heat dissipation control method are provided. The projection device includes a closed accommodating space, and a heating element, a cooling element, and an active dehumidification unit that are located inside the closed accommodating space. The heat dissipation control method includes the following steps: obtaining specification temperature information by a specification temperature information obtaining unit, and determining a specification temperature of the cooling element according to the specification temperature information; sensing an ambient temperature and an ambient humidity inside the closed accommodating space by a temperature and humidity sensing unit, and calculating a dew point temperature according to the ambient temperature and the ambient humidity; obtaining a cold end temperature of a cold end surface by a temperature sensing unit; and determining, based on the dew point temperature, the specification temperature, and the cold end temperature, whether to turn on or off the active dehumidification unit.

22 Claims, 5 Drawing Sheets

(56) References Cited

U.S. PATENT DOCUMENTS

| | | | | |
|---|---|---|---|---|
| 2013/0334966 | A1* | 12/2013 | Kumano | F21V 23/0457 |
| | | | | 315/117 |
| 2014/0313490 | A1* | 10/2014 | Miyamoyo | G03B 21/16 |
| | | | | 353/52 |
| 2014/0375965 | A1 | 12/2014 | Suzuki et al. | |
| 2015/0198869 | A1* | 7/2015 | Kuriaki | G03B 21/005 |
| | | | | 353/31 |
| 2015/0226417 | A1* | 8/2015 | Hirose | F21V 29/58 |
| | | | | 353/54 |
| 2017/0074501 | A1* | 3/2017 | Ito | G03B 21/14 |
| 2017/0146895 | A1* | 5/2017 | Ito | G03B 21/2033 |
| 2017/0356672 | A1* | 12/2017 | Kim | F24F 1/005 |
| 2018/0267393 | A1* | 9/2018 | Nomoto | F25B 21/02 |

FOREIGN PATENT DOCUMENTS

| | | |
|---|---|---|
| CN | 103513502 | 1/2014 |
| CN | 206460249 | 9/2017 |
| CN | 108678984 | 10/2018 |
| CN | 108776499 | 11/2018 |
| CN | 108916821 | 11/2018 |
| CN | 208175209 | 11/2018 |
| CN | 109442607 | 3/2019 |
| CN | 209590514 | 11/2019 |
| CN | 209707896 | 11/2019 |
| CN | 211293575 | 8/2020 |
| JP | 2019071320 | 5/2019 |
| KR | 100876185 | 12/2008 |
| KR | 20180019041 | 2/2018 |
| WO | 2006104302 | 10/2006 |
| WO | 2010143797 | 12/2010 |

OTHER PUBLICATIONS

"Office Action of China Related Application, application No. 201910353175.3", dated Jun. 1, 2021, p. 1-p. 9.

"Office Action of China Related Application, application No. 201910352362.X", dated Jun. 1, 2021, p. 1-p. 8.

* cited by examiner

PROJECTION DEVICE AND HEAT DISSIPATION CONTROL METHOD

CROSS-REFERENCE TO RELATED APPLICATION

This application claims the priority benefit of China application serial no. 202010052053.3, filed on Jan. 17, 2020. The entirety of the above-mentioned patent application is hereby incorporated by reference herein and made a part of this specification.

BACKGROUND

Technical Field

The disclosure relates to a projection device, and in particular, to a projection device and a heat dissipation control method.

Description of Related Art

With the development of projection technologies, projectors are widely used in homes, offices, schools and other places. As the projector has an increasingly high brightness, light valve elements or other optical elements in the projector bear more heat. In addition, nowadays, projectors are designed to be thinner and lighter. Although a traditional passive cooling element (such as a heat sink) may dissipate heat when used with a cooling fan, heat dissipation efficiency is to be further improved.

In order to improve the heat dissipation efficiency, a thermoelectric cooler (TEC) may be applied to a heat dissipation system of the projector. The TEC is an active heat dissipation element based on a semiconductor material. A DC voltage is applied to the TEC, so that heat flows from one end of the TEC to the other end, thereby forming a hot end and a cold end. In this way, the TEC can remove heat of the heating element through direct or indirect contact between the heating element in the projector and the cold end of the TEC to dissipate the heat. In addition, the cold end of the TEC may be cooled to a temperature less than an ambient temperature.

During heat dissipation of an optical component using the TEC, moisture condensation occurs at the cold end of the TEC. Moisture condensation reduces heat dissipation performance of the TEC and may cause damage to an electronic component. Although water vapor can be blocked by using sealants, waterproof paints, and special waterproof structures, the cooling performance of the TEC may decrease, and difficulty and additional costs in processing may be caused.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention provides a projection device and a heat dissipation control method, which can save power and avoid moisture condensation on a cooling element.

Other objectives and advantages of the invention may be further understood from the technical features disclosed in the invention.

In order to achieve one or some or all of the above purposes or other purposes, an embodiment of the invention provides a projection device. The projection device includes a closed accommodating space, a heating element, a cooling element, an active dehumidification unit, a specification temperature information obtaining unit, a temperature and humidity sensing unit, a temperature sensing unit, and a control unit. The cooling element includes a cold end surface and a hot end surface. The cold end surface is configured to dissipate heat of the heating element. The heating element, the cooling element, and the active dehumidification unit are located inside the closed accommodating space. The specification temperature information obtaining unit is configured to obtain specification temperature information. The temperature and humidity sensing unit is configured to sense an ambient temperature and an ambient humidity inside the closed accommodating space. The temperature sensing unit is configured to sense a cold end temperature of the cold end surface. The control unit is coupled to the specification temperature information obtaining unit, the temperature and humidity sensing unit, the temperature sensing unit, the active dehumidification unit, the cooling element, and the heating element, and is configured to determine a specification temperature of the cooling element according to the specification temperature information, and calculate a dew point temperature according to the ambient temperature and the ambient humidity. The control unit determines, based on the dew point temperature, the specification temperature, and the cold end temperature, whether to turn on or off the active dehumidification unit.

In order to achieve one or some or all of the above purposes or other purposes, an embodiment of the invention provides a heat dissipation control method applied to a projection device. The projection device includes a closed accommodating space, and a heating element, a cooling element, and an active dehumidification unit that are located inside the closed accommodating space. A cold end surface of the cooling element is configured to dissipate heat of the heating element. The heat dissipation control method includes the following steps: obtaining specification temperature information by a specification temperature information obtaining unit, and determining a specification temperature of the cooling element according to the specification temperature information; sensing an ambient temperature and an ambient humidity inside the closed accommodating space by a temperature and humidity sensing unit, and calculating a dew point temperature according to the ambient temperature and the ambient humidity; obtaining a cold end temperature of the cold end surface by a temperature sensing unit; and determining, based on the dew point temperature, the specification temperature, and the cold end temperature, whether to turn on or off the active dehumidification unit.

Based on the above, the embodiments of the invention have at least one of the following advantages or effects. According to the projection device and the heat dissipation control method of the invention, the active dehumidification unit is used, and it may be determined according to the dew point temperature, the specification temperature, and the cold end temperature whether to turn on or off the active dehumidification unit or adjust the power of the cooling element. In this way, moisture condensation on the cooling element can be avoided. Moreover, when the cold end temperature is less than the specification temperature, even if the cold end temperature is also less than the dew point temperature, the projection device can reduce the power of the cooling element without turning on the active dehumidification unit, so as to not only save power but also avoid moisture condensation on the cooling element.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The accompanying drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
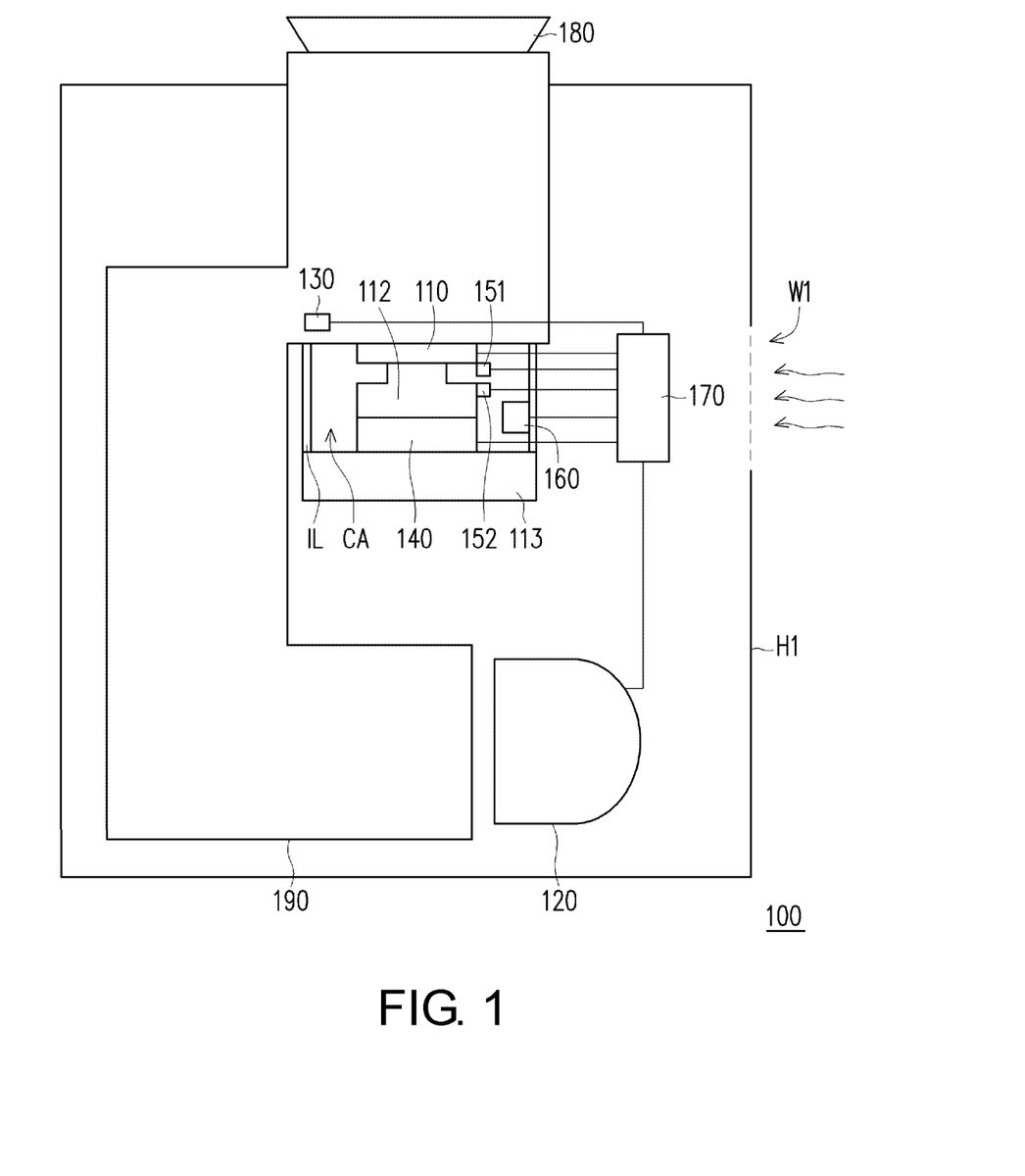
FIG. 1 is a schematic diagram of a projection device according to an embodiment of the invention.

FIG. 1 is a schematic diagram of a projection device 100 according to an embodiment of the invention. Referring to FIG. 1, a projection device 100 in the present embodiment includes a light valve module 110, an illumination source 120, a brightness sensing unit 130, a cooling element 140, a temperature and humidity sensing unit 151, a temperature sensing unit 152, an active dehumidification unit 160, a control unit 170, a projection lens module 180, an optical engine module 190, and a heat dissipating module 113.

In an embodiment, the illumination source 120 provides an illumination beam that may be transmitted to the light valve module 110. The illumination source 120 may include a light emitting diode, a laser diode or a lamp, or other illumination sources. The illumination source 120 may emit, for example, blue light or light beams of other colors. No limitation is imposed herein in the disclosure. For example, the illumination source 120 may include a plurality of laser elements (not shown). For example, the laser elements are arranged into an array, and the laser elements are, for example, laser diodes (LD). In other embodiments, there may be a plurality of illumination sources 120. In other embodiments, the illumination source 120 may be a solid-state illumination source such as a light emitting diode. In still other embodiments, the illumination source 120 may include a lamp.

In an embodiment, the optical engine module 190 includes an optical element, and directs the illumination beam generated by the illumination source 120 to the light valve module 110. The light valve module 110 includes, for example, a digital micromirror device (DMD) that may be configured to convert the illumination beam from the illumination source 120 into an image beam. The image beam is then provided to the projection lens module 180. The projection lens module 180 is configured to project the image beam to an outside so that the projection device 100 can achieve projection. The brightness sensing unit 130 is disposed beside a transmission path of the illumination beam to sense a brightness of the illumination beam from the illumination source 120. More specifically, the brightness sensing unit 130 may determine the brightness of the illumination beam by sensing stray light from the illumination source 120. In an embodiment, the brightness sensing unit 130 includes a photoresistor.

In an embodiment, the cooling element 140 is an active heat dissipation element, such as a thermoelectric cooler (TEC). The TEC is made of, for example, an N-type semiconductor compound, a P-type semiconductor compound, or other thermoelectric materials. The cooling element 140 has a cold end surface S1 and a hot end surface S2 (shown in FIG. 2). When the cooling element 140 is powered on, a temperature of the cold end surface S1 is less than a temperature of the hot end surface S2. In particular, in the present embodiment, the cold end surface S1 of the cooling element 140 in the projection device 100 is in direct or indirect contact with the heating element in the projection device 100, so that the cooling element 140 can take heat of the optical element away to dissipate the heat.

In the present embodiment, the cold end surface S1 of the cooling element 140 is connected to the light valve module 110 to dissipate heat of the light valve module 110, that is, the light valve module 110 is a heating element. In particular, the cold end surface S1 of the cooling element 140 may be connected to the light valve module 110 in a thermally conductive manner to absorb the heat of the light valve module 110. Thermal conductive paste or metal (for example, copper) may be further disposed between the cold end surface S1 of the cooling element 140 and the light valve module 110 as a heat conducting medium, but the invention is not limited thereto.

In an embodiment, the cooling element 140 may dissipate the heat of the light valve module 110 in combination with the heat dissipating module 113. The hot end surface S2 of the cooling element 140 may be connected to the heat dissipating module 113 in a thermally conductive manner to conduct heat to the heat dissipating module 113. In an embodiment, thermal conductive paste or metal (for example, copper) may be provided between the hot end surface S2 of the cooling element 140 and the heat dissipating module 113 as a heat conducting medium, but the invention is not limited thereto.

Figure 2:
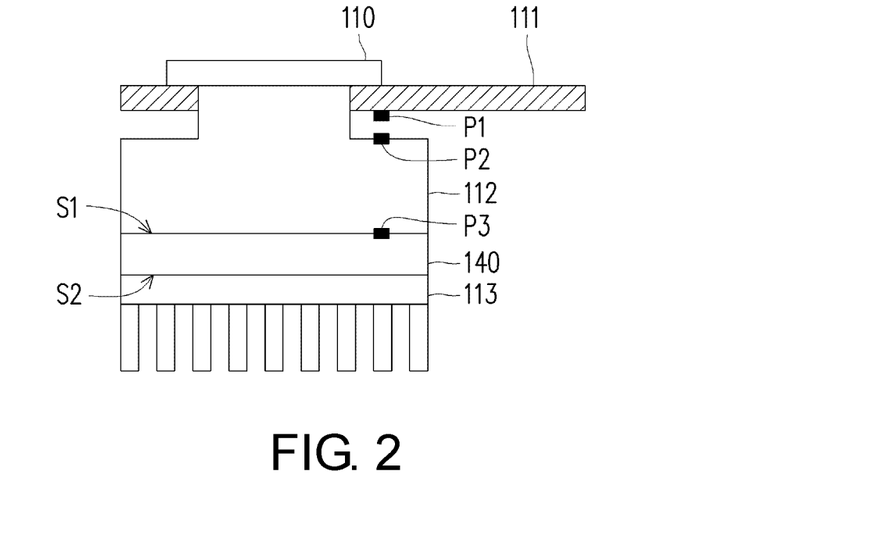
FIG. 2 is a schematic side view of a cooling element and a heat dissipating module in the projection device in FIG. 1.

FIG. 2 is a schematic side view of the cooling element 140 and the heat dissipating module 113 according to an embodiment of the invention. Referring to FIG. 2, the light valve module 110 is disposed on a carrier substrate 111. One end of a metal heat-conducting block 112 is connected to the light valve module 110 in a thermally conductive manner through a perforation of the carrier substrate 111. The other end of the metal heat-conducting block 112 is connected to the cold end surface S1 of the cooling element 140 in a thermally conductive manner. The hot end surface S2 of the cooling element 140 is connected to the heat dissipating module 113 (for example, a heat dissipation fin set) in a thermally conductive manner. Therefore, the cooling element 140 can conduct the heat of the light valve module 110 to the heat dissipating module 113, so as to dissipate the heat of the light valve module 110. In addition, in another embodiment not shown, the heat dissipating module 113 may also be a liquid-cooled heat dissipation system that dissipates the heat of the light valve module 110 using a gas, a liquid, or a two-phase fluid. A dissipation manner of the heat dissipating module 113 is not limited in the invention.

In an embodiment, the temperature and humidity sensing unit 151 is configured to sense an ambient temperature and an ambient humidity. As shown in FIG. 1 and FIG. 2, in the present embodiment, the projection device 100 further includes an isolation layer IL and a housing H1. The isolation layer IL is configured to form a closed accommodating CA space. In some embodiments, the isolation layer IL may also be configured to block external water vapor to reduce a possibility of moisture condensation. The light valve module 110 as a heating element, the cooling element 140, the temperature and humidity sensing unit 151, the temperature sensing unit 152, and the active dehumidification unit 160 are located inside the closed accommodating CA space. The housing H1 includes an air inlet W1. The air inlet W1 is adjacent to the closed accommodating CA space. The temperature and humidity sensing unit 151 may be adjacent to one side of the air inlet W1. However, in other embodiments, the temperature and humidity sensing unit 151 may be disposed at any position at which the ambient temperature and the ambient humidity can be detected. No limitation is imposed on this in the invention. For example, the temperature and humidity sensing unit 151 may be disposed adjacent to the cooling element 140.

In addition, in an embodiment, the temperature sensing unit 152 is configured to sense a cold end temperature of the cold end surface S1 of the cooling element 140. The temperature sensing unit 152 may be disposed at any position at which the cold end temperature of the cold end surface S1 can be sensed. For example, in the embodiment in FIG. 2, the temperature sensing unit 152 may be disposed at a position (for example, a position P1) on the carrier substrate 111 adjacent to the metal heat-conducting block 112, a position (for example, a position P2) on the metal heat-conducting block 112, a position (for example, a position P3) on the cold end surface S1, or other positions adjacent to the cold end surface S1. In addition, the temperature and humidity sensing unit 151 and the temperature sensing unit 152 may also be integrally formed and both disposed adjacent to the cooling element 140. Alternatively, when a temperature sensor is built in the cooling element 140, the temperature sensing unit 152 may also be a temperature sensor built in the cooling element 140, so that a more accurate temperature of the cold end surface S1 of the cooling element 140 can be measured.

In addition, in an embodiment, in particular, the active dehumidification unit 160 includes a physical adsorptive dehumidification element or a cooling dehumidification element that may be configured to eliminate water vapor in the environment to reduce the ambient humidity. For example, the physical adsorptive dehumidification element adsorbs water vapor using a material capable of absorbing water vapor to reduce the ambient humidity. The cooling dehumidification element may condense water vapor by forming a temperature difference using an electronic chip or through refrigerant dehumidification and discharge the water vapor, thereby reducing the ambient humidity. Further, the active dehumidification unit 160 may communicate with an outside of the closed accommodating CA space, so that the active dehumidification unit 160 can discharge water stored in the active dehumidification unit 160 after dehumidification. In addition, in this configuration, when dehumidification performance of the physical adsorptive dehumidification element of the active dehumidification unit 160 needs to be restored, the water vapor absorbed by the physical adsorptive dehumidification element may also be dissipated to the outside of the closed accommodating CA space through heating to restore the dehumidification performance of the physical adsorptive dehumidification element.

In an embodiment, the control unit 170 is coupled to the light valve module 110, the brightness sensing unit 130, the cooling element 140, the temperature and humidity sensing unit 151, the temperature sensing unit 152, the active dehumidification unit 160, and the illumination source 120. The control unit 170 is, for example, a central processing unit (CPU) or other programmable general-purpose or special-purpose microcontrol units (MCU), a microprocessor, a digital signal processor (DSP), a programmable controller, an application specific integrated circuit (ASIC), a graphics processing unit (GPU), an arithmetic logic unit (ALU), or other similar elements or a combination of the above elements. No limitation is imposed on this in the invention.

In the present embodiment, the control unit 170 may be coupled to a specification temperature information obtaining unit. The specification temperature information obtaining unit may be configured to obtain specification temperature information. The control unit 170 may obtain a specification temperature of the cooling element 140 based on the specification temperature information. In particular, the specification temperature may be used to determine whether the cold end surface S1 of the cooling element 140 has an excessive cold end temperature. When the cold end temperature of the cooling element 140 is greater than the specification temperature, it indicates that the ambient temperature in which the heating element is located is greater than an upper limit temperature at which the heating element can operate normally. In other words, heat of the heating element that can be taken away by the cooling element 140 is less than the heat generated by the heating element. Therefore, efficacy of the projection device 100 may be affected. In other words, as a basis for obtaining the specification temperature, the specification temperature information can reflect the upper limit temperature at which the heating element can operate normally.

More specifically, in the present embodiment, the light valve module 110 is a heating element. Heat generated by the light valve module 110 increases as a brightness increases. Therefore, working efficiency of the cooling element 140 also needs to be enhanced to take away the heat in a timely manner. It may be learned that cooling efficiency required for the cooling element 140 to dissipate the heat of the light valve module 110 may be adjusted according to a brightness sensed by the brightness sensing unit 130 or a brightness of the illumination source 120. In the present embodiment, the control unit 170 may determine the specification temperature of the cooling element 140 according to the brightness sensed by the brightness sensing unit 130. In other words, in the present embodiment, the brightness sensing unit 130 is the specification temperature information acquisition unit, and the brightness is the specification temperature information.

Figure 3:
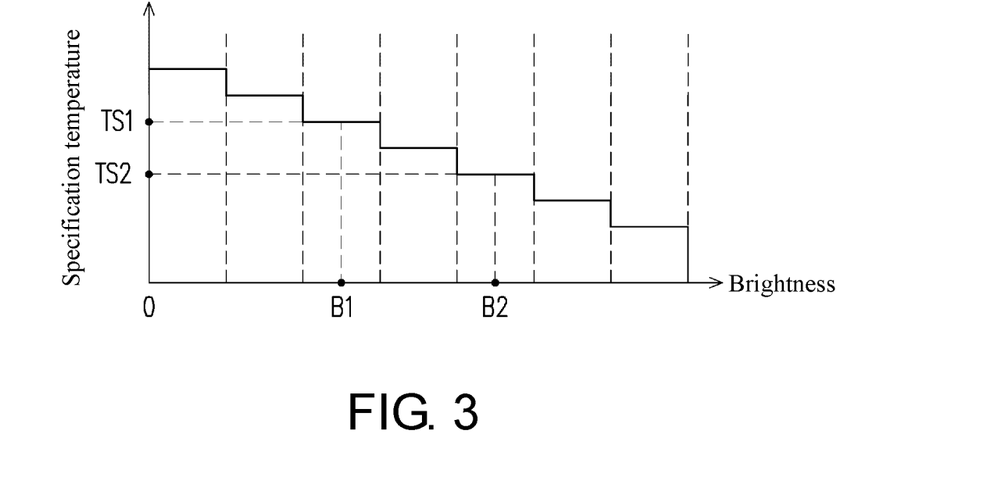
FIG. 3 is a schematic diagram of a relationship between a specification temperature and a brightness according to an embodiment of the invention.

For example, FIG. 3 is a schematic diagram of a relationship between a specification temperature and a brightness according to an embodiment of the invention. Referring to FIG. 3, different brightness intervals correspond to different specification temperatures. The control unit 170 may determine a corresponding specification temperature according to a brightness interval sensed by the brightness sensing unit 130. In the example of FIG. 3, when the brightness sensed by the brightness sensing unit 130 is a first brightness B1, the control unit 170 may determine that the specification temperature is a first temperature TS1. When the brightness sensed by the brightness sensing unit 130 is a second brightness B2 greater than the first brightness B1, the control unit 170 may determine that the specification temperature is a second temperature TS2 less than the first temperature TS1.

However, in another embodiment, the control unit 170 may also determine the specification temperature by querying a table. For example, Table 1 is an example of a relationship between a specification temperature and a brightness. The control unit 170 may obtain a brightness according to Table 1, and then query the table based on the brightness to obtain the specification temperature of the cooling element 140. In the present embodiment, the specification temperature information obtaining unit may be omitted, and the specification temperature information is operation temperature information, for example a brightness of the illumination source 120.

TABLE 1

| Brightness (lumen) | Specification temperature (° C.) |
|---|---|
| 12000 | 39 |
| 15000 | 35 |
| 18000 | 31 |

TABLE 1-continued

| Brightness (lumen) | Specification temperature (° C.) |
|---|---|
| 21000 | 27 |
| 24000 | 23 |
| 27000 | 20 |
| 30000 | 16 |

Table 1 and FIG. 3 are merely examples, and are not intended to limit the invention.

In an embodiment, after the specification temperature is obtained, the control unit 170 may calculate a dew point temperature according to the ambient temperature and the ambient humidity sensed by the temperature and humidity sensing unit 151. The dew point temperature is a critical temperature at which water in ambient air condenses from a gas into a liquid. In other words, when the ambient temperature is less than the dew point temperature, dew condensation may occur. Accordingly, the control unit 170 may determine, according to the dew point temperature, the specification temperature, and the cold end temperature of the cooling element 140, whether to turn on or off the active dehumidification unit 160, or further adjust a power of the cooling element 140 to avoid moisture condensation on the cooling element 140.

Figure 4:
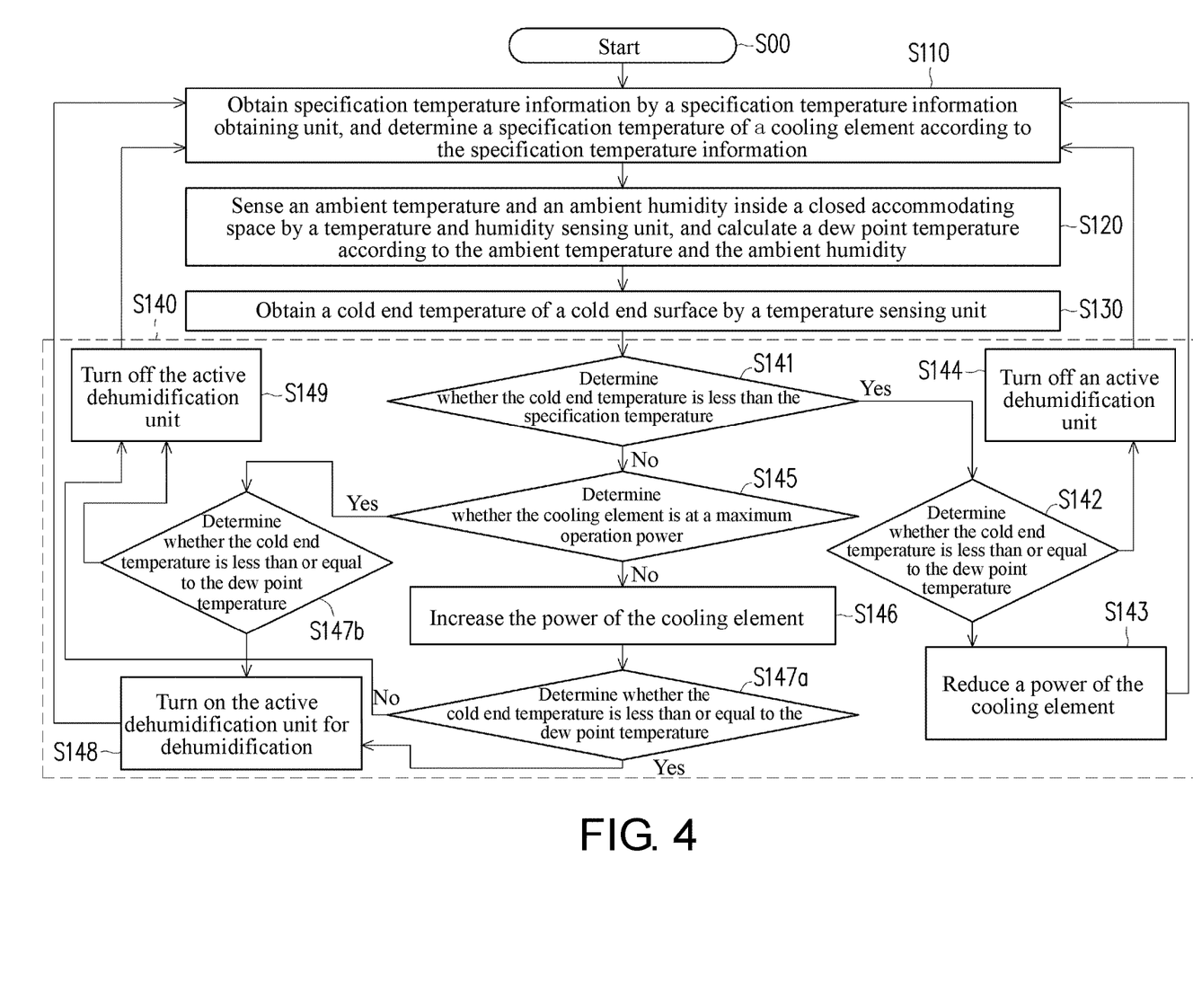
FIG. 4 is a flowchart of a heat dissipation control method according to an embodiment of the invention.

FIG. 4 is a flowchart of a heat dissipation control method according to an embodiment of the invention. The heat dissipation control method may be implemented by the elements in the projection device 100 shown in FIG. 1. Referring to both FIG. 1 and FIG. 4, detailed steps of the heat dissipation control method in the present embodiment are described below with the elements in the projection device 100 in FIG. 1.

In an embodiment, step S00 and step S110 are performed. The projection device 100 starts to be turned on, and the control unit 170 determines the specification temperature of the cooling element 140 according to the specification temperature information. In the present embodiment, the control unit 170 determines the specification temperature of the cooling element 140 according to the brightness sensed by the brightness sensing unit 130, that is, the brightness sensing unit 130 is the specification temperature information acquisition unit, and the brightness is the specification temperature information. As described above, the specification temperature may be used to determine whether the cold end temperature of the cold end surface S1 of the cooling element 140 meets requirements. If the cold end temperature of the cooling element 140 is greater than the specification temperature, it indicates that the ambient temperature of the heating element is greater than the upper limit temperature at which the heating element can operate normally. In this case, the power of the cooling element 140 needs to be increased to improve the heat dissipation performance, thereby reducing the cold end temperature.

In the present embodiment, step S120 is performed. The control unit 170 senses an ambient temperature and an ambient humidity inside the closed accommodating CA space by the temperature and humidity sensing unit 151, and calculates a dew point temperature according to the ambient temperature and the ambient humidity. The dew point temperature is a critical temperature at which water in the ambient air condenses from a gas into a liquid. In other words, when the cold end temperature of the cold end surface S1 of the cooling element 140 is less than the dew point temperature, dew condensation may occur.

In the present embodiment, step S130 is performed. The control unit 170 obtains the cold end temperature of the cold end surface S1 of the cooling element 140 through the temperature sensing unit 152. In particular, after the projection device 100 is turned on, the temperature of the light valve module 110 as a heating element gradually increases. When the temperature sensing unit 152 detects that the cold end temperature reaches a starting temperature point, or the control unit 170 determines that the cold end temperature increases to the specification temperature, the control unit 170 may turn on the cooling element 140 to dissipate heat of the heating element (for example, the light valve module 110). Therefore, the temperature of the light valve module 110 as a heating element slowly decreases.

In the present embodiment, step S140 is performed. The control unit 170 determines, according to the dew point temperature, the specification temperature, and the cold end temperature, whether to turn on or off the active dehumidification unit 160. In particular, as shown in FIG. 4, in the present embodiment, step S140 includes a plurality of steps S141 to S149.

Further, as shown in FIG. 4, in the present embodiment, in step S141, the control unit 170 determines whether the cold end temperature is less than the specification temperature. In particular, if the cold end temperature is less than the specification temperature, it indicates that the light valve module 110 currently as a heating element is in an environmental condition enabling normal operation. In this case, the control unit 170 may increase a power of the illumination source 120 to increase a brightness of an illumination beam of the illumination source 120. Alternatively, the control unit 170 may maintain the power of the illumination source 120 to maintain a specific brightness of the illumination beam. When the illumination beam is maintained at the specific brightness, the control unit 170 may further determine whether to reduce the power of the cooling element 140 or to turn off the active dehumidification unit 160 to save power and avoid moisture condensation on the cooling element 140.

For example, in an embodiment, when the control unit 170 determines that the cold end temperature is less than the specification temperature in step S141, step S142 of determining whether the cold end temperature is less than or equal to the dew point temperature is performed. When the control unit 170 determines that the cold end temperature is less than or equal to the dew point temperature, it indicates that moisture condensation may occur on the cooling element 140. Therefore, the control unit 170 may reduce the power of the cooling element 140 (step S143), so that the ambient temperature increases to a value greater than the dew point temperature to avoid moisture condensation. Furthermore, power may be saved through reduction of the power of the cooling element 140. Then, the process may return to step S110 to continuously monitor the dew point temperature, the specification temperature, and the cold end temperature of the projection device 100 to avoid moisture condensation.

In addition, in an embodiment, in step S142, when the control unit 170 determines that the cold end temperature is greater than the dew point temperature, step S144 of turning off the active dehumidification unit 160 is performed to save power, and the process returns to step S110. In particular, when the cold end temperature is greater than or equal to the dew point temperature, it indicates that the projection device 100 is currently in a normal operating state. Therefore, the active dehumidification unit 160 does not need to be turned on to reduce the ambient humidity. Instead, the active dehumidification unit 160 may be turned off to save power.

In addition, in an embodiment, in step S141, when the control unit 170 determines that the cold end temperature is greater than or equal to the specification temperature, it indicates that the cold end temperature of the cooling element 140 needs to be reduced. On this basis, step S145 in which the control unit 170 determines whether the cooling element 140 is at a maximum operation power is performed. If the control unit 170 determines that a result is "No", step S146 of increasing the power of the cooling element 140 is performed to further reduce the cold end temperature of the cooling element 140.

In an embodiment, step S147a in which the control unit 170 determines whether the cold end temperature is less than or equal to the dew point temperature is performed. When a determining result is "Yes", it indicates that moisture condensation may occur in the cooling element 140. In this case, the cold end temperature needs to be further reduced to obtain a required temperature. Therefore, step S148 of turning on the active dehumidification unit 160 for dehumidification is performed to reduce the dew point temperature.

Figure 5:
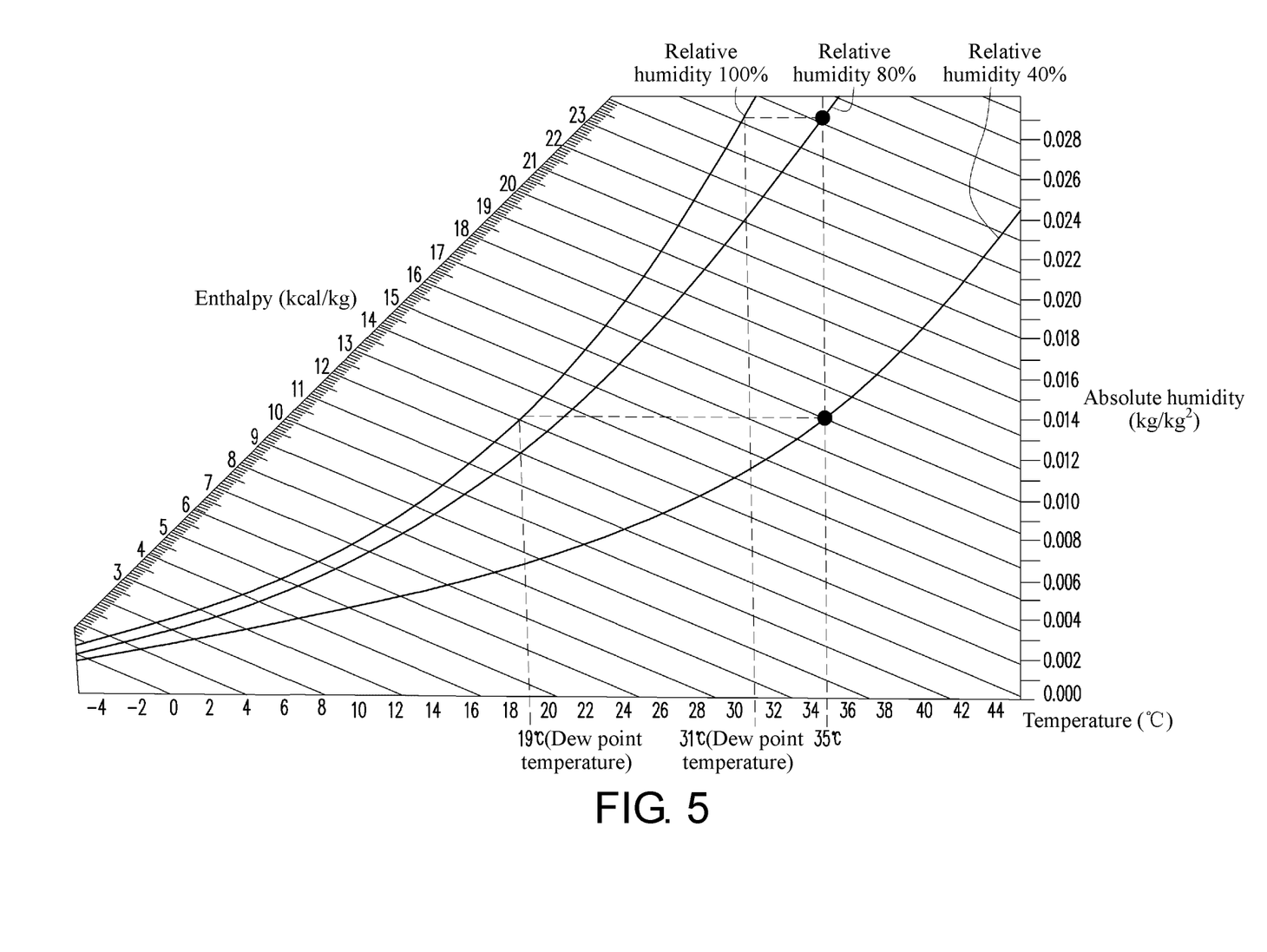
FIG. 5 is a schematic diagram of a relationship between a dew point temperature and an environmental condition according to an embodiment of the invention.

For example, FIG. 5 is a schematic diagram of a relationship between a dew point temperature and an environmental condition according to an embodiment of the invention. Referring to FIG. 5, when the ambient temperature inside the closed accommodating CA space in which the cooling element 140 and the light valve module 110 are located is 35° C. and the relative humidity is 80%, it is learned from FIG. 5 that the current dew point temperature is 31° C.

Furthermore, if a required brightness (specification temperature information) is set to 27,000 lumens, it may be learned from Table 1 that the specification temperature is 20° C. When the heating element is cooled through the cooling element 140 so that the temperature of the heating element reaches the specification temperature (20° C.), moisture condensation may occur in that the specification temperature (20° C.) is less than the dew point temperature (31° C.). In an embodiment, step S148 of turning on the active dehumidification unit 160 is performed to reduce the ambient humidity. For example, when the ambient humidity is reduced to 40% (a relative humidity), when the ambient temperature inside the closed accommodating CA space is 35° C., it may be learned from FIG. 5 that the current dew point temperature is 19° C. In this way, when the heating element is cooled through the cooling element 140 so that the temperature of the heating element reaches the specification temperature (20° C.), moisture condensation may be avoided in that the specification temperature (20° C.) is greater than the dew point temperature (19° C.). However, it is worth noting that the above numerical ranges are merely examples for illustration, and are not intended to limit the invention.

As shown in FIG. 4, after step S148 is performed, the process may return to step S110 for continuous monitoring. In addition, it is worth noting that in step S148, if the active dehumidification unit 160 performs dehumidification using the physical adsorptive dehumidification element, after the active dehumidification unit 160 is turned on, the control unit 170 determines, according to a sensing result of the temperature and humidity sensing unit 151, whether the ambient humidity inside the closed accommodating CA space decreases. When the ambient humidity inside the closed accommodating CA space does not decrease, the physical adsorptive dehumidification element needs to be isolated from the air inside the closed accommodating CA space, and internal dehumidification needs to be performed on the physical absorptive dehumidification element to restore the dehumidification performance of the physical adsorptive dehumidification element.

In addition, as shown in FIG. 4, in step S147a, when the control unit 170 determines that a result is "No", it indicates that no moisture condensation occurs on the cooling element 140. Therefore, step S149 of turning off the active dehumidification unit 160 is performed, and the process returns to step S110 to maintain a monitoring state.

In addition, as shown in FIG. 4, in step S145, if the control unit 170 determines that the power of the cooling element 140 is a maximum power of the cooling element 140 (that is, a determining result is "Yes"), step S147b of determining whether the cold end temperature is less than or equal to the dew point temperature is further performed. In step S147b, when the control unit 170 determines that the cold end temperature is less than or equal to the dew point temperature, step S148 of turning on the active dehumidification unit 160 for dehumidification is performed to reduce the dew point temperature. In addition, when the control unit 170 determines that a result is "No" in step S147a, the control unit determines to perform step S149 of turning off the active dehumidification unit 160, and the process returns step S110 to maintain to a monitoring state.

In this way, according to the projection device 100 and the heat dissipation control method of the invention, the active dehumidification unit 160 is configured, and it may be determined according to the dew point temperature, the specification temperature, and the cold end temperature, whether to turn on or off the active dehumidification unit 160 or adjust the power of the cooling element 140. In this way, the projection device 100 can avoid moisture condensation on the cooling element 140. Further, when the cold end temperature is less than the specification temperature and the dew point temperature, the power of the cooling element 140 may be reduced to save power and avoid moisture condensation.

Figure 6:
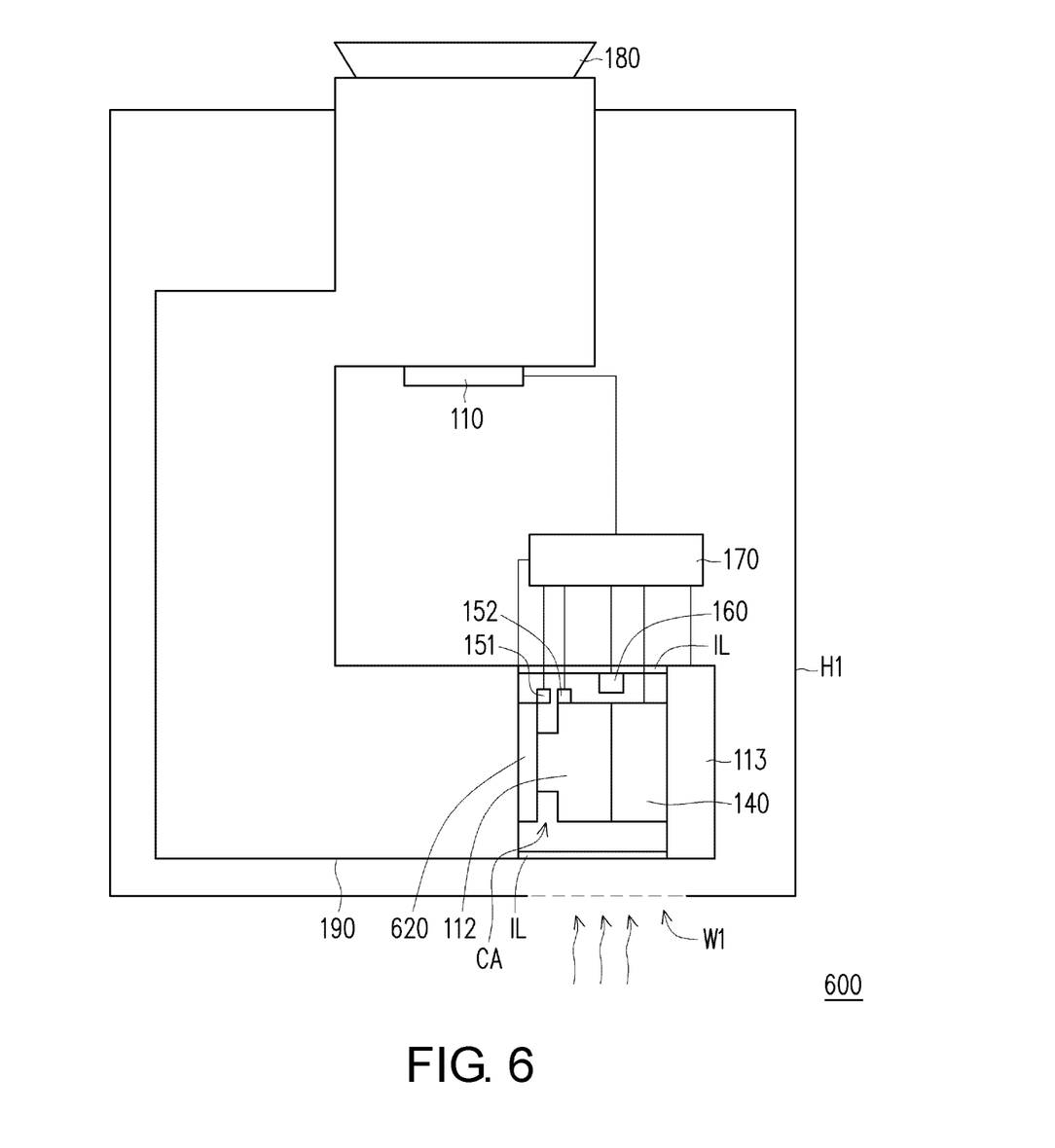
FIG. 6 is a schematic diagram of another projection device according to another embodiment of the invention.

FIG. 6 is a schematic diagram of another projection device according to another embodiment of the invention. Referring to FIG. 6, a projection device 600 in the present embodiment is similar to the projection device 100 in FIG. 1, and a difference is as follows. Referring to FIG. 6, in the present embodiment, the cold end surface S1 of the cooling element 140 is connected to an illumination source 620 to dissipate heat of the illumination source 620. In other words, in the present embodiment, the illumination source 620 is a heating element. For example, in the present embodiment, the illumination source 620 is a solid-state illumination source. In addition, a manner in which the cooling element 140 is connected to the illumination source 620 is similar to a manner in which the cooling element 140 of the projection device 100 in FIG. 1 is connected to the light valve module 110, and the descriptions thereof are omitted herein. Moreover, in the present embodiment, since the illumination source 620 is a heating element, the specification temperature of the cooling element 140 depends on the illumination source 620. In particular, the specification temperature of the cooling element 140 decreases as the brightness of the illumination source 620 increases. In the present embodiment, the specification temperature information obtaining unit may be omitted, and the specification temperature information is operation temperature information, for example, a brightness of the illumination source 120.

As shown in FIG. 6, in the present embodiment, since the illumination source 620 is a heating element, the isolation layer IL is configured to form a closed accommodating CA space, and the illumination source 620 as a heating element, the cooling element 140, the temperature and humidity sensing unit 151, the temperature sensing unit 152, and the active dehumidification unit 160 are located inside the closed accommodating CA space. A relative position configuration relationship thereof is also similar to that in FIG. 1. The descriptions thereof are omitted herein.

In this way, in the foregoing configuration, the heat dissipation control method in FIG. 4 may also be performed by the projection device 600 to dissipate the heat of the illumination source 620 and avoid condensation, thereby implementing functions and advantages similar to those of the foregoing projection device 100. The descriptions thereof are omitted herein. In addition, in the present embodiment, when a temperature of the illumination source 620 is the specification temperature, light emitting efficiency of the illumination source 620 can be prevented from increasing, and a number of elements used by the illumination source 620 is reduced, greatly reducing costs for the illumination source 620.

Based on the above, the embodiments of the invention have at least one of the following advantages or effects. According to the projection device and the heat dissipation control method of the invention, the active dehumidification unit is used, and it may be determined according to the dew point temperature, the specification temperature, and the cold end temperature whether to turn on or off the active dehumidification unit or adjust the power of the cooling element. In this way, moisture condensation can be avoided. Moreover, when the cold end temperature is less than the specification temperature, even if the cold end temperature is also less than the dew point temperature, the projection device can reduce the power of the cooling element without turning on the active dehumidification unit, so as to not only save power but also avoid moisture condensation on the cooling element.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection device, having a closed accommodating space and comprising a heating element, a cooling element, an active dehumidification unit, a specification temperature information obtaining unit, a temperature and humidity sensing unit, a temperature sensing unit, and a control unit, wherein
the cooling element comprises a cold end surface and a hot end surface, wherein the cold end surface is configured to dissipate heat of the heating element,
the heating element, the cooling element, and the active dehumidification unit are located inside the closed accommodating space,
the specification temperature information obtaining unit is configured to obtain specification temperature information,
the temperature and humidity sensing unit is configured to sense an ambient temperature and an ambient humidity inside the closed accommodating space,
the temperature sensing unit is configured to sense a cold end temperature of the cold end surface, and
the control unit is coupled to the specification temperature information obtaining unit, the temperature and humidity sensing unit, the temperature sensing unit, the active dehumidification unit, the cooling element, and the heating element, and the control unit is configured to determine a specification temperature of the cooling element according to the specification temperature information, and calculate a dew point temperature according to the ambient temperature and the ambient humidity, wherein
the control unit determines, based on the dew point temperature, the specification temperature, and the cold end temperature, whether to turn on or off the active dehumidification unit.

2. The projection device according to claim 1, wherein when the cold end temperature is less than the specification temperature, the control unit determines whether the cold end temperature is less than or equal to the dew point temperature, when the cold end temperature is less than or equal to the dew point temperature, the control unit reduces a power of the cooling element, and when the cold end temperature is greater than the dew point temperature, the control unit turns off the active dehumidification unit.

3. The projection device according to claim 1, wherein when the cold end temperature is greater than or equal to the specification temperature, the control unit determines whether the cooling element is at a maximum operation power, and when the cooling element is not at the maximum operation power, the control unit increases a power of the cooling element.

4. The projection device according to claim 3, wherein after the control unit increases the power of the cooling element, the control unit determines whether the cold end temperature is less than or equal to the dew point temperature, when the cold end temperature is less than or equal to the dew point temperature, the control unit turns on the active dehumidification unit for dehumidification, and when the cold end temperature is greater than the dew point temperature, the control unit turns off the active dehumidification unit.

5. The projection device according to claim 3, wherein when the control unit determines that the cooling element is at the maximum operation power, the control unit determines whether the cold end temperature is less than or equal to the dew point temperature, when the cold end temperature is less than or equal to the dew point temperature, the control unit turns on the active dehumidification unit for dehumidification, and when the cold end temperature is greater than the dew point temperature, the control unit turns off the active dehumidification unit.

6. The projection device according to claim 1, wherein the active dehumidification unit comprises a physical adsorptive dehumidification element or a cooling dehumidification element.

7. The projection device according to claim 6, wherein when the control unit turns on the active dehumidification unit, and the active dehumidification unit comprises the physical adsorptive dehumidification element, after the active dehumidification unit is turned on, the control unit determines whether the ambient humidity inside the closed accommodating space decreases, and when the ambient humidity inside the closed accommodating space does not decrease, the physical adsorptive dehumidification element is isolated from air inside the closed accommodating space, and internal dehumidification is performed on the physical adsorptive dehumidification element to restore dehumidification performance of the physical adsorptive dehumidification element.

8. The projection device according to claim 1, further comprising:
a light valve module; and
an illumination source configured to provide an illumination beam to the light valve module.

9. The projection device according to claim 8, wherein the heating element is the light valve module of the projection device, and the specification temperature information obtaining unit is a brightness sensing unit, wherein the brightness sensing unit is disposed beside a transmission path of the illumination beam to sense a brightness of the illumination beam, the brightness is the specification temperature information, and the control unit determines the specification temperature of the cooling element according to the brightness of the illumination beam.

10. The projection device according to claim 8, wherein the heating element is the illumination source of the projection device, the specification temperature information is operation temperature information of the illumination source, and the control unit determines the specification temperature of the cooling element according to the operation temperature information of the illumination source.

11. The projection device according to claim 1, further comprising:
an isolation layer configured to form the closed accommodating space; and
a housing comprising an air inlet, the air inlet being adjacent to the closed accommodating space.

12. The projection device according to claim 1, wherein the temperature and humidity sensing unit and the temperature sensing unit are adjacent to the cooling element, and the temperature and humidity sensing unit and the temperature sensing unit are integrally formed.

13. The projection device according to claim 1, further comprising:
a heat dissipating module, wherein the cold end surface of the cooling element is disposed on the heating element in a thermally conductive manner, and the hot end surface of the cooling element is disposed on the heat dissipating module in a thermally conductive manner.

14. The projection device according to claim 1, wherein after the control unit determines that the cold end temperature increases to the specification temperature, the control unit turns on the cooling element to dissipate heat of the heating element.

15. A heat dissipation control method adapted for a projection device, wherein the projection device has a closed accommodating space and comprises a heating element, a cooling element, and an active dehumidification unit which are located inside the closed accommodating space, a cold end surface of the cooling element is configured to dissipate heat of the heating element, and the heat dissipation control method comprises:
obtaining specification temperature information by a specification temperature information obtaining unit, and determining a specification temperature of the cooling element according to the specification temperature information;
sensing an ambient temperature and an ambient humidity inside the closed accommodating space by a temperature and humidity sensing unit, and calculating a dew point temperature according to the ambient temperature and the ambient humidity;
obtaining a cold end temperature of the cold end surface by a temperature sensing unit; and
determining, based on the dew point temperature, the specification temperature, and the cold end temperature, whether to turn on or off the active dehumidification unit.

16. The heat dissipation control method according to claim 15, wherein the step of determining, based on the dew point temperature, the specification temperature, and the cold end temperature, whether to turn on or off the active dehumidification unit comprises:
when the cold end temperature is less than the specification temperature, determining whether the cold end temperature is less than or equal to the dew point temperature; and
when the cold end temperature is less than or equal to the dew point temperature, reducing a power of the cooling element, and when the cold end temperature is greater than the dew point temperature, turning off the active dehumidification unit.

17. The heat dissipation control method according to claim 15, wherein the step of determining, based on the dew point temperature, the specification temperature, and the cold end temperature, whether to turn on or off the active dehumidification unit comprises:
when the cold end temperature is greater than or equal to the specification temperature, determining whether the cooling element is at a maximum operation power; and
when the cooling element is not at the maximum operation power, increasing a power of the cooling element.

18. The heat dissipation control method according to claim 17, wherein the step of determining, based on the dew point temperature, the specification temperature, and the cold end temperature, whether to turn on or off the active dehumidification unit further comprises:
after the power of the cooling element is increased, determining whether the cold end temperature is less than or equal to the dew point temperature; and
when the cold end temperature is less than or equal to the dew point temperature, turning on the active dehumidification unit for dehumidification, and when the cold end temperature is greater than the dew point temperature, turning off the active dehumidification unit.

19. The heat dissipation control method according to claim 17, wherein the step of determining, based on the dew point temperature, the specification temperature, and the cold end temperature, whether to turn on or off the active dehumidification unit further comprises:
when it is determined that the cooling element is at the maximum operation power, determining whether the cold end temperature is less than or equal to the dew point temperature; and
when the cold end temperature is less than or equal to the dew point temperature, turning on the active dehumidification unit for dehumidification, and when the cold end temperature is greater than the dew point temperature, turning off the active dehumidification unit.

20. The heat dissipation control method according to claim 15, wherein the heating element is a light valve module of the projection device, and the step of obtaining the specification temperature information by the specification temperature information obtaining unit, and determining the specification temperature of the cooling element according to the specification temperature information comprises:
obtaining, by a brightness sensing unit, a brightness of an illumination beam provided by an illumination source of the projection device, wherein the brightness sensing unit is the specification temperature information obtaining unit, and the brightness is the specification temperature information; and
determining the specification temperature of the cooling element according to the brightness.

21. The heat dissipation control method according to claim 15, wherein the heating element is an illumination source of the projection device, the specification temperature information is operation temperature information of the illumination source, and the step of determining the specification temperature of the cooling element according to the specification temperature information is determining the specification temperature of the cooling element according to the operation temperature information of the illumination source.

22. The heat dissipation control method according to claim 15, further comprising:
after it is determined that the cold end temperature increases to the specification temperature, turning on the cooling element to dissipate heat of the heating element.

* * * * *